United States Patent
He et al.

(10) Patent No.: US 12,308,703 B2
(45) Date of Patent: May 20, 2025

(54) MOTOR ROTOR AND IPM MOTOR

(71) Applicant: BEIJING ZHONG KE SAN HUAN HI-TECH CO., LTD., Beijing (CN)

(72) Inventors: Yeqing He, Beijing (CN); Jindong Wang, Beijing (CN); Xuewei Shi, Beijing (CN); Shan Bai, Beijing (CN); Xiaolei Rao, Beijing (CN); Boping Hu, Beijing (CN)

(73) Assignee: BEIJING ZHONG KE SAN HUAN HI-TECH CO., LTD., Beijing (CN)

( * ) Notice: Subject to any disclaimer, the term of this patent is extended or adjusted under 35 U.S.C. 154(b) by 282 days.

(21) Appl. No.: 17/884,404

(22) Filed: Aug. 9, 2022

(65) Prior Publication Data
US 2023/0051972 A1    Feb. 16, 2023

(30) Foreign Application Priority Data
Aug. 13, 2021 (CN) .......................... 202110931793.9

(51) Int. Cl.
  *H02K 1/276* (2022.01)
  *H01F 1/053* (2006.01)
  *H01F 1/057* (2006.01)
  *H02K 1/02* (2006.01)

(52) U.S. Cl.
  CPC ......... *H02K 1/2766* (2013.01); *H01F 1/0536* (2013.01); *H01F 1/057* (2013.01); *H02K 1/02* (2013.01)

(58) Field of Classification Search
  CPC .......... H02K 1/2766; H02K 1/27; H02K 1/02; H01F 1/0536; H01F 1/057
  USPC ...... 310/156.01, 156.48, 156.53, 156.56–57, 310/156.72, 156.84
  See application file for complete search history.

(56) References Cited

U.S. PATENT DOCUMENTS

| | | | | |
|---|---|---|---|---|
| 2018/0183289 A1* | 6/2018 | Horiuchi | ................. | H02K 1/279 |
| 2018/0219463 A1* | 8/2018 | Sasaki | ..................... | H02P 9/123 |

FOREIGN PATENT DOCUMENTS

| | | | | |
|---|---|---|---|---|
| CN | 209516769 U | * | 10/2019 | |
| CN | 112133552 A | * | 12/2020 | ........... C22C 38/002 |
| JP | 2004328963 A | * | 11/2004 | |
| WO | WO-2015146210 A1 | * | 10/2015 | ............. H02K 1/276 |
| WO | WO-2018051526 A1 | * | 3/2018 | ......... H01F 41/0293 |
| WO | WO-2020057847 A1 | * | 3/2020 | ........... H02K 1/2766 |

* cited by examiner

*Primary Examiner* — Jose A Gonzalez Quinones
(74) *Attorney, Agent, or Firm* — ANOVA LAW GROUP, PLLC

(57) ABSTRACT

A motor rotor includes an iron core. A mounting groove is recessed from an end surface of the iron core and extends in a direction from a middle of the iron core to an outer peripheral surface of the iron core. The motor rotor further includes a first magnet and a second magnet embedded in the mounting groove and arranged at an interval along an extension direction of the mounting groove. The first magnet is fixed at a radial outer side of the second magnet. A magnetization direction of each of the first magnet and the second magnet is perpendicular to the extension direction of the mounting groove. A coercive force of the first magnet being greater than a coercive force of the second magnet.

10 Claims, 3 Drawing Sheets

MOTOR ROTOR AND IPM MOTOR

CROSS-REFERENCE TO RELATED APPLICATION

This application claims priority to Chinese Application No. 202110931793.9, filed on Aug. 13, 2021, the entire content of which is incorporated herein by reference.

TECHNICAL FIELD

The present disclosure relates to the technical field of motors, and in particular, to a motor rotor and an IPM motor.

BACKGROUND

IPM (Interior Permanent Magnet) motor refers to a built-in-type permanent magnet motor with magnets embedded in the silicon steel core of the motor rotor. With the development of motor technology, various modern drive motors, including new energy vehicles, must increase the speed of the motor in order to increase the energy density of the motor (that is, the power output per unit motor volume). The higher the motor speed, the higher the frequency of the magnetic field from the stator armature that the magnet is subjected to. This alternating magnetic field acting on the magnet causes eddy currents to form in the magnet. On the one hand, the eddy current leads to an increase in the temperature of the magnet, a decrease in the magnetism, and even a loss of magnetism; on the other hand, because the eddy current has the effect of canceling the effective magnetic flux output of the magnet, the torque output of the motor decreases. In order to avoid high temperature demagnetization of the magnet, the traditional technology is increasing the intrinsic coercive force of the magnet, that is, improving the anti-demagnetization ability of the magnet. However, in order to obtain sintered Nd-Fe-B magnets with high coercivity, a large amount of expensive heavy rare earths must be consumed, and the higher the content of heavy rare earths, the lower the remanence of sintered Nd-Fe-B magnets and the lower the torque output of the motor. In other words, in order to prevent the problem of magnet demagnetization in high-speed motors, in the related technologies, not only high cost is paid, but also an ideal motor design is difficult to be achieved because sintered NdFeB magnets with low coercivity and high remanence cannot be used.

In a permanent magnet motor, the closer to the working air gap of the motor (that is, the gap between the rotor and the stator), the larger the reverse demagnetization field generated by the stator armature; and, due to factors such as engineering structural factors and manufacturing tolerances, the alternating magnetic field generated by the stator armature and acting on the rotor also includes so-called higher-order harmonics having frequencies higher than the fundamental frequency of the motor. Because the eddy current loss is proportional to the square of the frequency of the magnetic field, the closer to the permanent magnet part of the working air gap of the motor, the more significant the eddy current heating is, and the easier it is to demagnetize. That is to say, since the corners of the magnet are close to the stator, the demagnetization field on the corners is high, and the probability of demagnetization is high. Since the remaining part of the magnet are far away from the stator, the demagnetization field on the remaining part is low, it is usually not easy to demagnetize. Therefore, in the related technology, in order to reduce the cost, a composite magnet formed by a combination of high-coercivity magnets for the corners and low-coercivity magnets for the remaining part can be used to reduce the cost. At present, the way to combine high coercivity magnets with high remanence and low coercivity magnets is to prepare high coercivity magnets and conventional magnets separately, and then bond the two and then grind them to form composite magnets, so as to ensure the composite magnets are well combined during rotation at high speed to prevent the magnet from flying out. However, this method greatly increases the manufacturing cost of the magnet, and when the temperature of the motor increases, the adhesive layer softens rapidly, and there is a danger that the magnet's adhesive force will drop and the magnet fly out of the rotor.

SUMMARY

The purpose of the present disclosure is to provide a motor rotor and an IPM motor having the motor rotor, so as to solve the problems of complicated procedures and high cost in the related art of manufacturing composite magnets with high coercivity and low coercivity.

In order to achieve the above object, the present disclosure provides a motor rotor, which includes an iron core, a mounting groove being recessed from an end surface of the iron core, and magnets embedded in the mounting groove, the mounting groove extending along the direction from a middle of the iron core to an outer peripheral surface of the iron core. The magnets include first magnets and second magnets that are arranged at intervals along the extension direction of the mounting groove and whose magnetization direction is perpendicular to the extension direction of the mounting groove, wherein the first magnet is fixed at the radially outer side of the second magnet, and the coercive force of the first magnet is greater than the coercive force of the second magnet.

Optionally, the coercivity ratio of the first magnet and the second magnet is in a range from 1.2:1 to 2.6:1.

Optionally, the first magnet is a sintered NdFeB magnet with a coercivity range from 19 kOe to 43 kOe, and the second magnet is a sintered NdFeB magnet with a coercivity range from 12 kOe to 25 kOe.

Optionally, the length of the first magnet is less than the length of the second magnet.

Optionally, the remanence of the first magnet is smaller than the remanence of the second magnet.

Optionally, the length ratio of the first magnet to the second magnet is in a range from 1:3 to 1:8.

Optionally, adjacent surfaces of the first magnet and the second magnet form an included angle with each other.

Optionally, the included angle between the adjacent surfaces of the first magnet and the second magnet is in a range from 2° to 20°.

Optionally, the minimum gap between the first magnet and the second magnet is greater than or equal to 0.1 mm.

Optionally, the height of the first magnet and the second magnet is not greater than the depth of the mounting groove.

Optionally, a limiting member is set in the mounting groove to fix the first magnet and the second magnet in a preset position.

Optionally, at least one end of the mounting groove is formed as an empty flux barrier, and the limiting member includes a protrusion disposed in the flux barrier to block the first magnet or the second magnet.

Optionally, the motor rotor comprises a plurality of pairs of mounting grooves arranged at intervals in the same circumferential direction, wherein a V-shaped structure with the opening facing outward is formed by each pair of mounting grooves, wherein the motor rotor includes a plurality of sets of the V-shaped structure spaced along the circumferential direction.

According to a second aspect of the present disclosure, there is also provided an IPM motor comprising an annular motor stator and a motor rotor rotatably arranged inside the motor stator, wherein the rotor is the motor rotor described above.

Through the above technical solution, the first magnet with high coercivity is used for the part with high risk of loss of magnetism, and the second magnet with low coercivity is used for the part with low risk of loss of magnetism. This combination not only can resist the demagnetization formed when the motor is working, but also has a lower cost due to less use of heavy rare earth. Since the first magnet and the second magnet are arranged at intervals, they only need to be fixed in the mounting groove respectively, and it is not necessary to consider the higher cost of combining the two through a complex bonding process, which reduces the cost. Also because of this, the problem caused by the combination of two magnets is fundamentally eliminated, that is, on the one hand, deviation of shape and position of the composite magnet is formed during the bonding process, and more grinding is required to make the composite magnet achieve the required accuracy, which increases the manufacturing cost; on the other hand, the bonding composite magnet is easy to cause the softening of the binder and the decrease of the bonding strength due to the increase of temperature during operation, and the magnet is separated. In addition, the spaced arrangement of the first magnet and the second magnet avoids the problems of obvious temperature rise and serious demagnetization caused by the eddy currents that are brought together when the two magnets touch together. Therefore, under the same usage conditions, the coercive force of the first magnet of the embodiments of the present disclosure can be lower than the coercive force of the corner magnet in the composite magnet, thereby reducing the cost.

Other features and advantages of the present disclosure will be described in detail in the detailed description that follows.

BRIEF DESCRIPTION OF THE DRAWINGS

The accompanying drawings are used to provide a further understanding of the present disclosure, and constitute a part of the specification, and together with the following detailed description, are used to explain the present disclosure, but not to limit the present disclosure. In the drawings.

DESCRIPTION OF REFERENCE CHARACTERS

100—motor rotor, 110—iron core, 111—mounting groove, 112—anti-demagnetization slot, 120—magnet, 121—first magnet, 122—second magnet, 200—motor stator, 210—coil.

DETAILED DESCRIPTION OF EMBODIMENTS

Hereinafter, embodiments of the present disclosure are described in detail with reference to the drawings. It should be understood that the specific embodiments described herein are only used to illustrate and explain the present disclosure, but not to limit the present disclosure.

In the present disclosure, unless otherwise stated, the use of directional words such as "inner" and "outer" refers to the contour of the corresponding component, "axial," "radial," and "circumferential" are all based the motor rotor as a reference.

First of all, it should be noted that the coercive force mentioned in the embodiments of the present disclosure refers to the intrinsic coercive force (Hcj), and the remanence refers to the residual magnetization (Br). In addition, for the convenience of description, in the embodiments of the present disclosure, the magnet is a regular shape of a cuboid as an example for description, but it is not limited thereto. For example, the "lengths" of the first magnet and the second magnet mentioned below refer to the corresponding side lengths, and specifically, the corresponding distances in the extension directions of the first magnet and the second magnet in the mounting groove are defined as their lengths. correspondingly, the distance perpendicular to the extension direction is defined as its width; and when the cross-section of the two is a rhombus, the "length" can be the length of the diagonal, and when the cross-section of the two is a trapezoid, the "length" can be the length of the base of the trapezoid; as another example, the "included angle between the adjacent surfaces" of the first magnet and the second magnet is formed by the inclination of the two adjacent surfaces; the angle can also be formed by the inclined waistline of the trapezoid. Of course, these situations are only examples, and based on the concept of the embodiments of the present disclosure, there may be various modifications.

Figure 1:
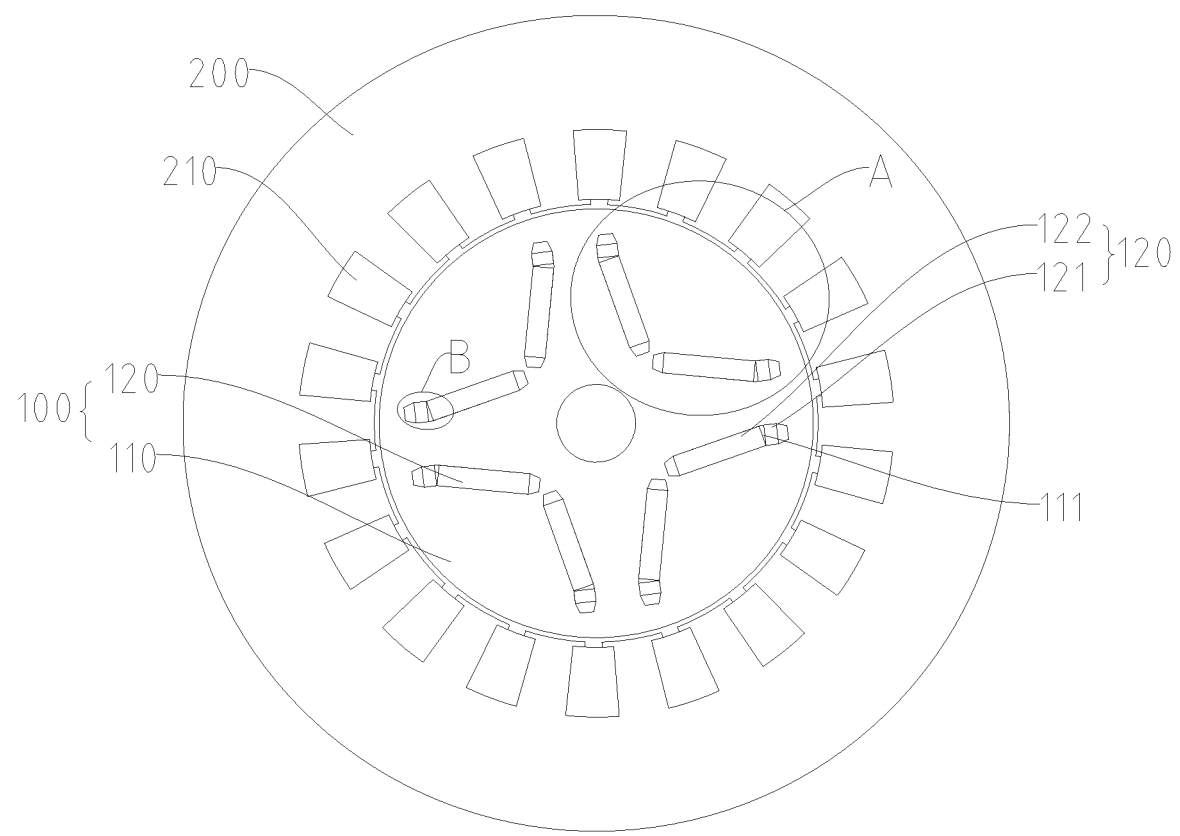
FIG. 1 is a schematic view of an IPM motor according to the embodiments of the present disclosure.

Referring to FIG. 1, the present disclosure provides an IPM motor, which includes an annular motor stator 200 and a motor rotor 100 rotatably disposed inside the motor stator 200. The motor stator 200 is wound with a coil 210, and the rotating motor rotor 100 and the energized coil 210 generate electromagnetic induction to generate mechanical energy.

Figure 2:
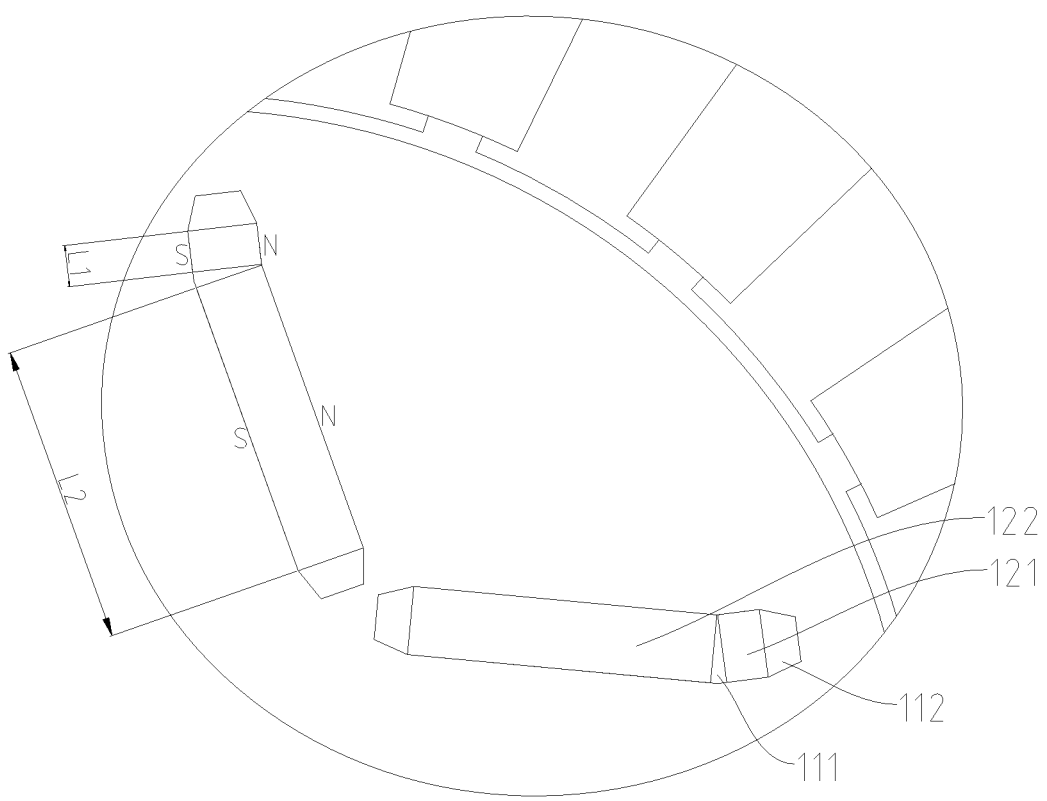
FIG. 2 is a enlarged view of part A in FIG. 1.

Referring to FIG. 1 and FIG. 2, a motor rotor provided by an embodiment of the present disclosure includes an iron core 110, a mounting groove 111 recessed from an end surface of the iron core 110, and magnet 120 embedded in the mounting groove 111. Wherein, the mounting groove 111 extends along the direction from the middle of the iron core 110 to the outer peripheral surface, and the extension direction is radial or at a certain angle to the radial direction, but not perpendicular to the radial direction. In this way, the mounting groove 111 has an inner end close to the shaft center and an outer end close to the motor stator 100.

The magnet 120 includes a first magnet 121 and a second magnet 122 which are arranged at intervals along the extension direction of the mounting groove 111 and whose magnetization direction is perpendicular to the extension direction of the mounting groove. It should be noted here that for a magnet, its magnetization direction can be understood as the connecting direction from the N pole to the S pole. For example, in FIG. 2, the mounting groove 111 on the left side of the figure generally extends up and down along the direction of the drawing. The extension directions of the first magnet 121 and the second magnet 122 are the same, and the magnetization directions of the two are generally left and right along the direction of the drawing. It should also be pointed out that the "perpendicular" mentioned here is not an absolute angle of 90° in the geometric sense, and those skilled in the art should understand that it may have a certain inclination angle.

Referring to FIG. 1 and FIG. 2, in the embodiments of the present disclosure, the first magnet 121 is fixed at the radially outer side of the second magnet 122, and the coercive force of the first magnet 121 is greater than the coercive force of the second magnet 122, that is, the first magnet 121 with higher coercivity is closer to the motor stator 200. In this way, the first magnet 121 with high coercivity is used for the part with high risk of demagnetization, and the second magnet 122 with low coercivity is used for the part with low risk of demagnetization. This combination can effectively resist the demagnetization generated when the motor is working, and also have lower cost due to less heavy rare earth use. Since the first magnet 121 and the second magnet 122 are arranged at intervals, it is only necessary to fix the two in the mounting groove 111 respectively, and there is no need to consider combining the two into one through complex bonding, grinding and other processes, reducing the cost. Also because of this, the problem caused by the combination of two magnets is fundamentally eliminated, that is, on the one hand, deviation of shape and position of the composite magnet is formed during the bonding process, and more grinding is required to make the composite magnet achieve the required accuracy, which increases the manufacturing cost; on the other hand, the bonding composite magnet is easy to cause the softening of the binder and the decrease of the bonding strength due to the increase of temperature during operation, and the magnet is separated. In addition, the spaced arrangement of the first magnet 121 and the second magnet 122 avoids the eddy currents caused by the two magnets touch together converging at this position, resulting in significant temperature rise and serious demagnetization. Therefore, under the same usage conditions, the coercive force of the first magnet 121 of the embodiments of the present disclosure may be lower than the coercive force of the corner magnets in the composite magnet, thereby reducing the cost.

Referring to FIG. 1, the motor rotor 100 may include a plurality of mounting grooves arranged at intervals in the same circumferential direction, wherein a V-shaped structure with the opening facing outward is formed by two adjacent mounting grooves. The motor rotor 100 includes a plurality of V-shaped structures spaced along the circumferential direction. Specifically, in the embodiment shown in FIG. 1, there are four groups of V-shaped structures in total. In this embodiment, the mounting groove 111 has a certain angle with the radial direction of the motor rotor 100. In other embodiments, the mounting groove 111 may also extend in the radial direction, and the motor rotor 100 has a plurality of mounting grooves 111 in an annular array.

In order to prevent the first magnet 121 and the second magnet 122 from protruding from the end face of the iron core 110, the heights of the first magnet 121 and the second magnet 122 are set to be no greater than the depth of the mounting groove 111, that is, they are completely hidden inside the iron core 110. It should be understood that the heights of the first magnet 121 and the second magnet 122 and the depth of the mounting groove 111 are the dimensions in the axial direction of the motor rotor 100.

In addition, in order to fix the first magnet 121 and the second magnet 122 into the mounting groove 111, a limiting member may be provided in the mounting groove 111 to fix the magnet 120 at a preset position and prevent the first magnet 121 and the second magnet 122 from falling off when the motor rotor 100 moves at a high speed. The embodiments of the present disclosure does not limit the specific type of the limiting member. For example, according to one embodiment, the first magnet 121 and the second magnet 122 may be interference fit with the mounting groove 111 respectively; according to another embodiment, a blocking protrusion can be provided in the groove 111 to fix the magnet; or according to another embodiment, the first magnet 121 and the second magnet 122 can be fixed by an adhesive such as epoxy resin in the mounting groove 111. Of course, the foregoing embodiments can also be used in combination.

Further, referring to FIG. 2, at least one end of mounting groove 111 can be formed as an empty flux barrier, and limiting member can include a protrusion disposed in flux barrier to block first magnet 121 or second magnet 122. That is, the position of the corresponding magnet 120 is limited by means of blocking the protrusion as described above.

It should be understood that the above-mentioned "high" and "low" coercivity are relative concepts. According to some embodiments, the coercivity ratio of the first magnet 121 and the second magnet 122 may be 1.2:1-2.6:1, Specifically, the coercive force of the first magnet 121 may be between 19 kOe and 43 kOe, and the coercive force of the second magnet 122 may be between 12 kOe and 25 kOe, both of which may be sintered NdFeB magnets, or other any suitable kind of magnet.

Since the demagnetizing field generated when the motor is running is mainly the part of the magnet 120 close to the motor stator 200, in the embodiments of the present disclosure, the length of the first magnet 121 may be set to be smaller than the length of the second magnet 122.

Further, the length of the first magnet 121 may be configured to be less than ⅓ of the length of the second magnet 122, and further, the length of the first magnet 121 may be configured to be from ⅛ to ⅓ of the length of the second magnet 122. Further, the length of the first magnet 121 may be configured to be from ⅛ to ¼ of the length of the second magnet 122.

In addition, in the embodiments of the present disclosure, the remanence of the first magnet 121 may be configured to be smaller than the remanence of the second magnet 122, that is, the second magnet 122 with a larger size has a higher remanence. In this way, excessively low remanence due to excessively high coercive force of the second magnet can be avoided, and the output torque of the motor can be maximized.

According to some embodiments, the adjacent surfaces of the first magnet 121 and the second magnet 122 may form an angle with each other, that is, the adjacent surfaces of the two are not parallel. In this way, high torque, less eddy loss, and less temperature rise can be better achieved. Referring to the above, the design in which the adjacent surfaces form an angle with each other can be formed by the inclined surfaces of the contours of the first magnet 121 and the second magnet 122; also referring to FIG. 2 and FIG. 3, it can be realized by arranging the rectangular first magnet 121 and the second magnet 122 into the installation slot 111 with a certain included angle, and when the mounting groove 111 forms the above-mentioned V-shaped structure, the included angle of the mounting groove 111 itself and the bending directions of the included angle of the two mounting grooves 111 can be consistent, forming the effect of gradually adducting as a whole. In some embodiments, the angle between the adjacent surfaces of the first magnet 121 and the second magnet 122 can be designed to be from 2° to 20°, for example, from 7° to 15°, such as from 8° to 15°.

According to some embodiments, the minimum gap between the first magnet 121 and the second magnet 122 is greater than or equal to 0.1 mm to ensure that the requirements for the space layout of the rotor 100 and the requirement for reducing eddy losses can be balanced. In some embodiments, the minimum gap can be greater than or equal to 0.2 mm. Under the circumstance that the aforementioned adjacent surfaces of the first magnet 121 and the second magnet 122 may form an included angle with each other, referring to FIG. 3, the minimum gap X between the first magnet 121 and the second magnet 121 is greater or equal to 0.1 mm, for example, X is greater or equal to 0.2 mm. Correspondingly, after the angle between the adjacent surfaces of the first magnet 121 and the second magnet 122 is determined, the maximum gap Y between the two is also easy to calculate.

Figure 3:
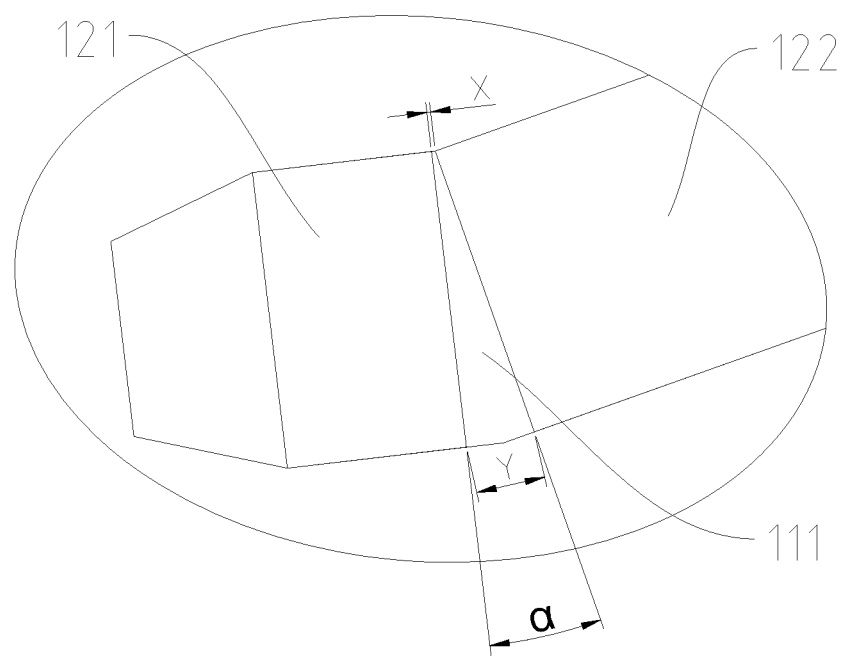
FIG. 3 is a enlarged view of part B in FIG. 1.

Some embodiments of dimension designs of the first magnet 121 and the second magnet 122 will be given below with reference to FIG. 2 and FIG. 3 in a non-limiting manner. First of all, it should be noted that, in the following embodiments, unless otherwise specified, the first magnet 121 adopts 42UH grade of sintered NdFeB magnets with a coercive force of 25 kOe and a remanence of 13.3 kGs, the second magnet 122 adopts 48H grade of sintered NdFeB magnets with the coercive force of 16 kOe and the remanence of 13.8 kGs. The first magnet 121 and the second magnet 122 are both cuboid magnets, the width of the first magnet 121 and the width of the second magnet 122 are both 50 mm, and the height of the first magnet and the height of the second magnet are both 4.0 mm. During the operation of the motor, demagnetization occurs only at the position of the magnet 120 close to the motor stator 200 due to the combined action of the eddy current temperature rise and the demagnetization field. Therefore, the first magnet 121 is focused on in each embodiment.

Embodiment I

The length value L2 of the second magnet 122 is 22 mm, the angle value α between the adjacent faces of the first magnet 121 and the second magnet 122 is 0°, and the minimum gap value X between the adjacent faces of the first magnet 121 and the second magnet 122 is 0.2 mm, and since the adjacent surfaces of the first magnet 121 and the second magnet 122 are parallel, the aforementioned minimum gap is also the maximum gap.

JMAG17.0 electromagnetic simulation calculation is carried out in different cases where the length value L1 of the first magnet 121 is 3 mm, 5 mm, 8 mm, 11 mm respectively, and the total eddy current loss (i.e., eddy loss), the motor output torque of the magnet 120 and the temperature rise coefficient of the first magnet 121 can be obtained, shown in Table 1 below. The temperature rise coefficient value is the value of (eddy loss$_{current\ example}$/volume$_{current\ example}$)/(eddy loss$_{comparative\ example}$/volume$_{comparative\ example}$). The percentage data in the table is based on the case where there is no gap between the first magnet 121 and the second magnet 122, and the sum of their lengths is 25 mm (defined as a "comparative example") as a reference. In the comparative example, the first magnet 121 and the second magnet 122 may be in close contact or as a whole. It should be pointed out here that the temperature rise coefficient of the first magnet 121 is defined by the ratio of the eddy current loss to the length L1, which is positively related to the temperature rise rate. During the simulation process, the overall eddy current loss (displayed as thermal energy) and output torque can be directly obtained, which is not explained in detail here.

TABLE 1

(Embodiment I)

| L1 (mm) | Eddy current loss (%) | Output torque (%) | Temperature rise coefficient of the first magnet (%) |
|---|---|---|---|
| 3 | 75.80 | 99.08 | 17.1 |
| 5 | 63.67 | 99.70 | 26.6 |
| 8 | 54.44 | 99.71 | 48.1 |
| 11 | 50.44 | 99.71 | 64.0 |

From the simulation results shown in Table 1, it can be easily concluded that when the length value L1 of the first magnet 121 is 3 mm and 5 mm, the overall eddy current loss reduction effect of the magnet 120 and the temperature rise suppression effect at the first magnet 121 are both in good condition and has little effect on the output torque of the motor. Therefore, when the length ratio of the first magnet 121 and the second magnet 122 is between 1:3 and 1:8, the motor rotor 100 has a better working state.

Embodiment II

Since the eddy current increases with the increase of the motor speed, the solution of the first embodiment is adopted, and when the length value L1 of the first magnet 121 is, for example, 3 mm, in order to further explore the possibility of reducing the eddy current loss, in the second embodiment, simulation experiments are carried out by changing the included angle between the adjacent surfaces of a magnet 121 and a second magnet 122. Here, the length value L2 of the second magnet 122 is 22 mm, the length value L1 of the first magnet 121 is 3 mm, and the minimum gap value X value between the adjacent faces of the first magnet 121 and the second magnet 122 is 0.2 mm.

Performing computer simulation calculations in different situations where the angle value α between the adjacent surfaces of the first magnet 121 and the second magnet 122 is 0°, 2°, 8°, 10°, 15°, 20° respectively, the total eddy current loss and the motor output torque of the magnet 120 can be obtained and the temperature rise coefficient of the first magnet 121 are also obtained in Table 2 below, wherein the percentage data in the table is based on the first set of data (i.e., the case of) α=0°.

TABLE 2

(Embodiment II)

| α (°) | Eddy current loss (%) | Output torque (%) | Temperature rise coefficient of the first magnet (%) |
|---|---|---|---|
| 0 | 100 | 100 | 100 |
| 2 | 88.9 | 98.7 | 79.3 |
| 8 | 81.4 | 97.8 | 66.7 |
| 10 | 85.8 | 98.8 | 70.0 |
| 15 | 88.8 | 99.1 | 74.5 |
| 20 | 89.7 | 99.2 | 77.6 |

From the simulation results shown in Table 2, it is easy to conclude that when the value of a is small (such as 0°-8° in the table), as the angle increases, the output torque of the motor has little effect, and the overall eddy current of the magnet decreases. When the value of α is further increased, all three are improved. Among them, when the value of α is close to 20°, the improvement amplitude becomes slower.

When the angle value α between the adjacent surfaces of the first magnet 121 and the second magnet 122 is 2°, 8°, 10°, 15°, 20° respectively, the temperature rise coefficient of the first magnet 121 can be reduced to less than 80%, and it can be reduced to less than 75% when the value of α is 8°, 10°, and 15° respectively. Therefore, within the range of the angle value α between the adjacent surfaces of the first magnet 121 and the second magnet 122 being from 2° to 20°, for example, from 7° to 15°, such as from 8° to 15°, while the overall eddy current loss is reduced, the effect of suppressing the temperature rise of the first magnet 121 is obvious (compared to Embodiment 1, the effect can be further improved), and the impact on the output torque of the motor is small.

Embodiment III

The length value L2 of the second magnet 122 is 22 mm, the length value L1 of the first magnet 121 is 3 mm, and the angle value α between the adjacent surfaces of the first magnet 121 and the second magnet 122 is 15°.

The computer simulation calculation is carried out for different situations where the minimum gap X between the first magnet 121 and the second magnet 122 is different, and the eddy current loss, the motor output torque and the temperature rise coefficient of the first magnet 121 can be obtained shown in the following table 3, wherein, the percentage data in the table is based on the case where there is no gap between the first magnet 121 and the second magnet 122 and the sum of their lengths is 25 mm (the first magnet 121 and the second magnet 122 can be in close contact or as a whole) as a reference.

TABLE 3

(Embodiment III)

| X (mm) | Eddy current loss (%) | Output torque (%) | Temperature rise coefficient of the first magnet (%) |
|---|---|---|---|
| 0.1 | 86.7 | 98.6 | 13.9 |
| 0.2 | 81.3 | 97.9 | 12.7 |
| 0.5 | 74.2 | 97.8 | 12.0 |
| 1 | 72.9 | 97.4 | 12.9 |
| 1.5 | 71.2 | 95.7 | 13.0 |

From the simulation results shown in Table 3, it can be easily concluded that when the minimum gap value X between the first magnet 121 and the second magnet 122 is 0.1 mm, 0.2 mm, 0.5 mm, 1 mm, 1.5 mm respectively, the reduction effects of the overall eddy current loss of the magnet 120 is obvious, the impact on the output torque of the motor is small, and the reduction effect of the temperature rise coefficient has reached a good state, that is, the value of the minimum gap value X is greater than or equal to 0.1 mm, for example, greater than 0.2 mm, the effect is significant.

Embodiment IV

The length value L2 of the second magnet 122 is 22 mm, the length value L1 of the first magnet 121 is 3 mm, the angle value α between the adjacent faces of the first magnet 121 and the second magnet 122 is 15°, the minimum gap value X between the first magnet 121 and the second magnet 122 is 0.5 mm. Performing electromagnetic simulation calculation, the total eddy current loss, the motor output torque of the magnet 120, and the temperature rise coefficient of the first magnet 121 are obtained shown in the following Table 4. Among them, the percentage data in the table is based on the case (defined as "Reference Example") as a reference in which the magnet 120 with a length value of 25 mm, a grade of 42UH of sintered NdFeB magnets with a coercive force of 25 kOe and a remanence of 13.3 kGs, that is, in this reference example, the properties of the magnet 120 are the same as those of the first magnet 121 in the fourth embodiment.

TABLE 4

(Embodiment IV)

| | Eddy current loss (%) | Output torque (%) | Temperature rise coefficient of the first magnet (%) |
|---|---|---|---|
| Reference Example | 100 | 100 | 100 |
| Embodiment IV | 87.9 | 121.9 | 14.1 |

It can be easily concluded from the simulation results shown in Table 4, compared with the traditional form of using a single high-coercivity magnet, the fourth embodiment can achieve the effect of significantly reducing the eddy current loss and temperature rise coefficient, and significantly increasing the output torque.

Some embodiments of the present disclosure have been described in detail above with reference to the accompanying drawings. However, the present disclosure is not limited to the specific details of the above-mentioned embodiments. Within the scope of the technical concept of the present disclosure, various simple modifications can be made to the technical solutions of the present disclosure. These simple modifications all fall within the protection scope of the present disclosure.

In addition, it should be noted that, the specific technical features described in the above-mentioned specific embodiments can be combined in any suitable manner unless they are inconsistent. In order to avoid unnecessary repetition, the present disclosure provides. The combination method will not be specified otherwise.

In addition, the various embodiments of the present disclosure can also be arbitrarily combined, as long as they do not violate the spirit of the present disclosure, they should also be regarded as the contents disclosed in the present disclosure.

The invention claimed is:
1. A motor rotor comprising:
an iron core, a mounting groove being recessed from an end surface of the iron core and extending in a direction from a middle of the iron core to an outer peripheral surface of the iron core; and
a first magnet and a second magnet embedded in the mounting groove and arranged at an interval along an extension direction of the mounting groove, the first magnet being fixed at a radial outer side of the second magnet, a magnetization direction of each of the first magnet and the second magnet being perpendicular to the extension direction of the mounting groove, and a coercive force of the first magnet being greater than a coercive force of the second magnet;

wherein:
a ratio of the coercive force of the first magnet to the coercive force of the second magnet is in a range from 1.2:1 to 2.6:1;
a ratio of a length of the first magnet to a length of the second magnet is in a range from 1:4 to 1:8; and
an included angle between adjacent surfaces of the first magnet and the second magnet is in a range from 7° to 15°.

2. The motor rotor according to claim 1, wherein the first magnet includes a sintered NdFeB magnet with a coercivity in a range from 19 kOe to 43 kOe, and the second magnet is a sintered NdFeB magnet with a coercivity in a range from 12 kOe to 25 kOe.

3. The motor rotor according to claim 1, wherein a remanence of the first magnet is smaller than a remanence of the second magnet.

4. The motor rotor according to claim 1, wherein a minimum gap between the first magnet and the second magnet is greater than or equal to 0.1 mm.

5. The motor rotor according to claim 1, wherein a height of each of the first magnet and the second magnet is not greater than a depth of the mounting groove.

6. The motor rotor according to claim 1, wherein:
at least one end of the mounting groove is formed as a flux barrier.

7. The motor rotor according to claim 1, wherein:
the mounting groove is one of a pair of mounting grooves spaced apart from each other in a circumferential direction of the iron core and forming a V-shaped structure with an opening facing the outer peripheral surface of the iron core; and
the first magnet is a pair of first magnets each arranged in one of the pair of mounting grooves, and the second magnet is a pair of second magnets each arranged in one of the pair of mounting grooves.

8. The motor rotor according to claim 7, wherein:
the pair of mounting grooves is one of a plurality of pairs of mounting grooves arranged at intervals along the circumferential direction and each forming a V-shaped structure with an opening facing the outer peripheral surface of the iron core;
the pair of first magnets is one of a plurality of pairs of first magnets each arranged in one of the plurality of pairs of mounting grooves, and the pair of second magnets is one of a plurality of pairs of second magnets each arranged in one of the plurality of pairs of mounting grooves.

9. An interior permanent magnet (IPM) motor comprising:
an annular motor stator; and
a motor rotor rotatably arranged inside the motor stator and including:
an iron core, a mounting groove being recessed from an end surface of the iron core and extending in a direction from a middle of the iron core to an outer peripheral surface of the iron core; and
a first magnet and a second magnet arranged at an interval along an extension direction of the mounting groove, the first magnet being fixed at a radial outer side of the second magnet, a magnetization direction of each of the first magnet and the second magnet being perpendicular to the extension direction of the mounting groove, and a coercive force of the first magnet being greater than a coercive force of the second magnet;
wherein:
a ratio of the coercive force of the first magnet to the coercive force of the second magnet is in a range from 1.2:1 to 2.6:1;
a ratio of a length of the first magnet to a length of the second magnet is in a range from 1:4 to 1:8; and
an included angle between adjacent surfaces of the first magnet and the second magnet is in a range from 7° to 15°.

10. The IPM motor according to claim 9, wherein a minimum gap between the first magnet and the second magnet is greater than or equal to 0.1 mm.

* * * * *